United States Patent
Lee et al.

(10) Patent No.: US 11,809,339 B2
(45) Date of Patent: Nov. 7, 2023

(54) DATA BUS, DATA PROCESSING METHOD THEREOF, AND DATA PROCESSING APPARATUS

(71) Applicant: SAMSUNG ELECTRONICS CO., LTD., Suwon-si (KR)

(72) Inventors: Keongho Lee, Seoul (KR); Youngseh Kim, Hwaseong-si (KR); Wonjin Kim, Suwon-si (KR); Seungbeom Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 28 days.

(21) Appl. No.: 17/191,255

(22) Filed: Mar. 3, 2021

(65) Prior Publication Data
US 2021/0279190 A1 Sep. 9, 2021

(30) Foreign Application Priority Data

Mar. 6, 2020 (KR) .......................... 10-2020-0028654

(51) Int. Cl.
*G06F 13/16* (2006.01)
*G06F 16/23* (2019.01)

(52) U.S. Cl.
CPC ...... *G06F 13/1668* (2013.01); *G06F 16/2379* (2019.01)

(58) Field of Classification Search
None
See application file for complete search history.

(56) References Cited

U.S. PATENT DOCUMENTS

| | | | | |
|---|---|---|---|---|
| 4,282,583 A * | 8/1981 | Khan | ..................... | B41J 29/393 711/156 |
| 4,443,663 A * | 4/1984 | Ellis | ................... | H04Q 11/0407 379/284 |
| 4,471,169 A * | 9/1984 | Lenk | ................... | H04M 19/026 379/253 |
| 4,555,595 A * | 11/1985 | Brightman | ......... | H04Q 11/0407 379/284 |
| 6,185,629 B1 * | 2/2001 | Simpson | ............. | G06F 12/0215 711/170 |
| 7,043,673 B1 * | 5/2006 | Ichiriu | ................... | G11C 15/00 714/719 |
| 7,089,253 B2 * | 8/2006 | Hinshaw | ............. | G06F 16/2308 707/703 |
| 7,146,366 B2 * | 12/2006 | Hinshaw | ............. | G06F 16/2308 |

(Continued)

FOREIGN PATENT DOCUMENTS

WO 2016099036 6/2016

*Primary Examiner* — Henry Tsai
*Assistant Examiner* — Christopher A Bartels
(74) *Attorney, Agent, or Firm* — F. Chau & Associates, LLC

(57) ABSTRACT

A data bus includes: a transaction selection circuit configured to receive vector data including a plurality of transactions from outside of the data bus, select at least one transaction from the plurality of transactions in which no traffic conflict occurs based on whether there is a traffic conflict among the plurality of transactions, and output the selected at least one transaction; and a memory data path including at least one register and configured to output the selected at least one transaction provided by the transaction selection circuit via the at least one register to the outside of the data bus.

19 Claims, 17 Drawing Sheets

(56) References Cited

U.S. PATENT DOCUMENTS

| | | | |
|---|---|---|---|
| 7,610,057 B2* | 10/2009 | Bahl | H04W 88/06 |
| | | | 455/433 |
| 8,688,957 B2 | 4/2014 | Smelyanskiy et al. | |
| 8,868,517 B2 | 10/2014 | Gygi et al. | |
| 9,203,771 B1* | 12/2015 | Cai | H04L 45/38 |
| 9,519,617 B2 | 12/2016 | Hung et al. | |
| 9,552,205 B2 | 1/2017 | Ermolaev et al. | |
| 9,596,184 B1* | 3/2017 | Cai | H04L 47/125 |
| 9,817,762 B2 | 11/2017 | Kapil et al. | |
| 9,928,170 B2 | 3/2018 | Koker et al. | |
| 9,965,187 B2 | 5/2018 | Gokhale et al. | |
| 10,031,871 B2 | 7/2018 | Kawakami | |
| 10,152,451 B2 | 12/2018 | Sperber et al. | |
| 10,268,580 B2 | 4/2019 | Doshi et al. | |
| 10,332,302 B2 | 6/2019 | Vembu et al. | |
| 10,409,596 B2 | 9/2019 | Cho et al. | |
| 11,494,787 B2* | 11/2022 | Erickson | G06N 3/08 |
| 2003/0101307 A1* | 5/2003 | Gemelli | G06F 30/30 |
| | | | 710/305 |
| 2004/0064439 A1* | 4/2004 | Hinshaw | G06F 16/2308 |
| 2004/0078379 A1* | 4/2004 | Hinshaw | G06F 16/2308 |
| 2004/0259589 A1* | 12/2004 | Bahl | H04W 16/14 |
| | | | 455/553.1 |
| 2005/0239497 A1* | 10/2005 | Bahl | H04W 88/06 |
| | | | 455/552.1 |
| 2013/0212353 A1 | 8/2013 | Mimar | |
| 2015/0236959 A1* | 8/2015 | Cai | H04L 47/24 |
| | | | 709/235 |
| 2016/0028985 A1* | 1/2016 | Vogelsang | H04N 5/347 |
| | | | 348/294 |
| 2016/0350010 A1 | 12/2016 | Ryan et al. | |
| 2017/0371657 A1 | 12/2017 | Mahurin et al. | |
| 2021/0001810 A1* | 1/2021 | Rivard | G06V 40/172 |
| 2021/0406917 A1* | 12/2021 | Erickson | G06N 3/084 |
| 2023/0025252 A1* | 1/2023 | Erickson | G06Q 30/0185 |

* cited by examiner

FIG. 5A

|    | T1 | T2 | T3 | T4 | T5 | T6 | T7 | T8 |
|----|----|----|----|----|----|----|----|----|
| T1 |    |    |    | 1  |    |    |    | 1  |
| T2 |    |    |    | 1  |    |    |    | 1  |
| T3 |    |    |    |    | 1  |    |    |    |
| T4 | 1  | 1  |    |    |    |    |    | 1  |
| T5 |    |    | 1  |    |    |    |    |    |
| T6 |    |    |    |    |    |    |    |    |
| T7 |    |    |    |    |    |    |    |    |
| T8 | 1  | 1  |    | 1  |    |    |    |    |

Conflict Table

DATA BUS, DATA PROCESSING METHOD THEREOF, AND DATA PROCESSING APPARATUS

CROSS-REFERENCE TO RELATED APPLICATION

This U.S. non-provisional patent application claims the benefit of priority under 35 U.S.C. § 119 to Korean Patent Application No. 10-2020-0028654, filed on Mar. 6, 2020 in the Korean Intellectual Property Office, the disclosure of which is incorporated by reference in its entirety herein.

1. Technical Field

The inventive concept relates to a data bus, a data processing method of the data bus, and a data processing apparatus, and more particularly, to a data bus for transferring vector data, a data processing method of the data bus, and a data processing apparatus.

2. Discussion of Related Art

A vector processor is a central processing unit that implements an instruction set including instructions that operate vector data. For example, multimedia data can be processed more efficiently using a vector processor. A computer system includes a data bus for exchanging the vector data between the vector processor and a vector memory. The vector processor gathers a plurality of pieces of data from the vector memory by using the data bus, and performs a scattering operation on the plurality of pieces of data. A unit of work for performing one logical function in the vector processor is called a transaction. The vector data includes a plurality of transactions. Transferring a transaction to the vector memory may include use of one or more registers. The number of these registers may increase as the number of bank memories in the vector memory increases or as an operating frequency of the vector processor increases. Accordingly, a technique for efficiently delivering the plurality of transactions by using less hardware resources is required.

SUMMARY

At least one embodiment of the inventive concept provides a data bus, a data processing method of the data bus, and a data processing apparatus, and more particularly, a method and apparatus for storing a plurality of transactions in a memory including a plurality of memory banks with reduced traffic conflict.

According to an exemplary embodiment of the inventive concept, there is provided a data bus including: a transaction selection circuit configured to receive vector data including a plurality of transactions from outside of the data bus, select at least one transaction from the plurality of transactions in which no traffic conflict occurs based on whether there is the traffic conflict among the plurality of transactions, and output the selected at least one transaction; and a memory data path including at least one register and configured to output the selected at least one transaction provided by the transaction selection circuit via the at least one register to the outside of the data bus.

According to an exemplary embodiment of the inventive concept, there is provided a data processing method of a data bus including: the data bus receiving vector data including a plurality of transactions; the data bus obtaining a conflict table including information about whether there is a traffic conflict among the plurality of transactions; the data bus selecting at least one transaction from the transactions in which no traffic conflict occurs among the plurality of transactions based on the conflict table; and the data bus outputting the selected at least one transaction.

According to an exemplary of the inventive concept, there is provided a data processing device including: a processor configured to output vector data including a plurality of transactions; a memory including a plurality of memory banks and configured to store the plurality of transactions; and a data bus configured to select at least one transaction in which no traffic conflict occurs among the plurality of transactions, based on whether there is the traffic conflict among the plurality of transactions, and provide the selected at least one transaction to the plurality of memory banks via a memory data path having a tree structure.

According to an exemplary embodiment of the inventive concept, there is provided a data processing method of a data bus for providing data to a plurality of memory banks including: the data bus receiving vector data including a plurality of transactions; the data bus outputting at least one first transaction in which no traffic conflict occurs among the plurality of transactions based on a conflict table including information about whether there is a traffic conflict among the plurality of transactions; the data bus updating the conflict table based on information about the at least one first transaction; and the data bus outputting at least one second transaction in which no traffic conflict occurs among the transactions except the at least one first transaction among the plurality of transactions based on the updated conflict table.

According to an exemplary embodiment of the inventive concept, there is provided a data processing device including: a processor configured to output vector data including a plurality of transactions; a memory including a plurality of memory banks and configured to store the plurality of transactions; and a data bus configured to receive the plurality of transactions from the processor, and provide the plurality of transactions to the plurality of memory banks. The data bus includes: a transaction selection circuit configured to generate a conflict table including information about whether there is a traffic conflict among the plurality of transactions, select at least one transaction in which no traffic conflict occurs among the plurality of transactions based on the conflict table, and output the selected at least one transaction; and a data memory path including a plurality of stages. The stages include a first stage register configured to receive the selected at least one transaction provided by the transaction circuit, and at least one state register connected to the first stage register in a tree structure. The data memory path is configured to provide data from each of last stage registers of the stages to each of the plurality of memory banks.

BRIEF DESCRIPTION OF THE DRAWINGS

Exemplary embodiments of the inventive concept will be more clearly understood from the following detailed description taken in conjunction with the accompanying drawings in which:

FIGS. 5A and 5B illustrate conflict tables according to exemplary embodiments of the inventive concept;

FIGS. 8A through 8E are diagrams illustrating processes of a data processing method of a data bus, according to exemplary embodiments of the inventive concept;

DETAILED DESCRIPTION OF THE EXEMPLARY EMBODIMENTS

Hereinafter, exemplary embodiments of the inventive concept are described in detail with reference to the accompanying drawings.

Figure 1:
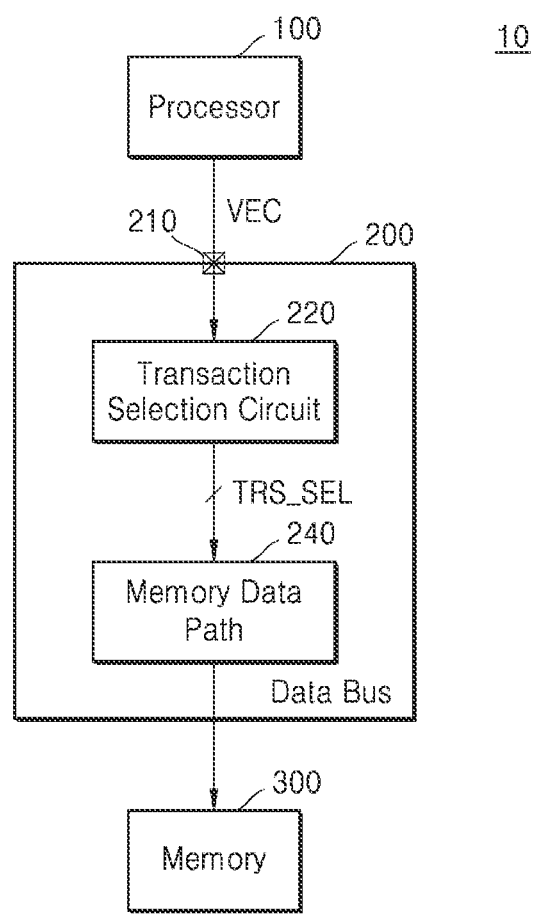
FIG. 1 illustrates a data processing system according to an exemplary embodiment of the inventive concept.

FIG. 1 illustrates a data processing apparatus 10 according to an exemplary embodiment of the inventive concept. The data processing apparatus 10 includes a processor 100, a data bus 200, and a memory 300 (e.g., a vector memory). The data processing apparatus 10 may be implemented in various devices which process data. For example, the data processing apparatus 10 may be included in one of various devices such as an ultra mobile personal computer (PC) (UMPC), a workstation, a netbook, a personal digital assistant (PDA), a portable computer, a web tablet, a wireless phone, a mobile phone, a smart phone, an e-book, a portable multimedia player (PMP), a portable game machine, a navigation device, a black box, and a digital camera. In addition, the data processing apparatus 10 may be implemented in a neural network device for accelerating a neural network (e.g., an artificial neural network).

The processor 100 may control all operations of the data processing apparatus 10. For example, the processor 100 may include a central processing unit (CPU). The processor 100 may include one single core or a plurality of cores. The processor 100 may execute or process programs and/or data stored in the memory 300. For example, the processor 100 may control various functions of the data processing apparatus 10 by executing programs stored in the memory 300. The processor 100 may process vector data VEC. The vector data VEC may be stored in the memory 300, or may be received from the memory 300. In this case, the processor 100 may store the vector data VEC in the memory 300 via the data bus 200.

The data bus 200 may provide a channel between various components in the data processing apparatus 10. The data bus 200 may operate based on one of various bus protocols. The various bus protocols may include at least one of various interface protocols such as a universal serial bus (USB) protocol, a multi media card (MMC) protocol, a peripheral component interconnection (PCI) protocol, a PCI-Express (PCI-E) protocol, an advanced technology attachment (ATA) protocol, a serial-ATA protocol, a parallel-ATA protocol, a small computer small interface (SCSI) protocol, an enhanced small disk interface (ESDI) Protocol, and a universal flash storage (UFS) protocol.

The memory 300 may store control information such as various data, programs, and instructions used in the data processing apparatus 10. In an embodiment, the memory 300 may be implemented with a volatile memory, and the volatile memory may include at least one of dynamic random access memory (RAM) (DRAM), synchronous DRAM (SDRAM), double data rate (DDR) SDRAM (DDR SDRAM), low power DDR SDRAM (LPDDR SDRAM), graphics DDR (GDDR SDRAM), rambus DRAM (RDRAM), and static (SRAM). The memory 300 may store the vector data VEC including a plurality of transactions. In an exemplary embodiment, at least one of the transactions is a logical operation (e.g., an add, a subtract, multiply, divide, etc.) performed on data stored in a certain location (e.g., bank, sub-bank, strobe, etc.) of the memory 300 by the processor. In an embodiment, the memory 300 includes a plurality of memory banks to store the plurality of transactions. In an embodiment, each of the memory banks includes a plurality of sub-memory banks, and each of the plurality of sub-memory banks includes a plurality of strobes (e.g., stripes). An embodiment of an implementation of the memory 300 is described in more detail with reference to FIG. 2.

In an embodiment, the data bus 200 receives the vector data VEC including the plurality of transactions from the processor 100 via an input port 210. The data bus 200 may, based on whether there is a traffic conflict among the plurality of transactions, select at least one transaction in which the traffic conflict does not occur, and output the selected at least one transaction. For example, the data bus 200 may provide the selected at least one transaction to the memory 300. In an exemplary embodiment, a traffic conflict occurs between two transactions when those two transactions are scheduled to operate on data stored in a same strobe, a same sub-bank, or a same memory bank, at the same time.

In an exemplary embodiment, the data bus 200 includes a transaction selection circuit 220 and a memory data path 240.

In an exemplary embodiment, the transaction selection circuit 220 selects at least one transaction in which a traffic conflict does not occur among the plurality of transactions included in the vector data VEC, and outputs the selected transaction TRS_SEL. In an exemplary embodiment, the transaction selection circuit 220 generates (or obtains) a conflict table including information about whether a traffic conflict has occurred among the plurality of transactions, and outputs the selected transaction TRS_SEL by selecting at least one transaction in which the traffic conflict does not occur based on the conflict table.

In an exemplary embodiment, the transaction selection circuit 220, based on the conflict table, outputs at least one first transaction in which no traffic conflict occurs, as the selected transaction TRS_SEL, and may update the conflict table based on information about the at least one first transaction. In an embodiment, the conflict table is updated based on a list associated with the at least one first transaction. For example, all element values included in a row corresponding to the at least one first transaction in the conflict table may be updated to a first logical value. After the traffic conflict is updated, the transaction selection circuit 220, based on the updated conflict table, outputs at least one second transaction in which the traffic conflict does not occur among the transactions except the at least one first transaction among the plurality of transactions, as the selected transaction TRS_SEL. In other words, the transaction selection circuit 220 may provide the plurality of transactions to the memory data path 240 by performing at least one of a series of operations including transaction selection, outputting, and updating of the conflict table.

The memory data path 240 may include at least one register, and may transfer the selected transaction TRS_SEL provided by the transaction selection circuit 220 to the memory 300. In an exemplary embodiment of the inventive concept, the memory data path 240 includes registers connected in a tree structure. For example, the memory data path 240 may include a first stage register receiving the selected transaction TRS_SEL, and may further include at least one stage register connected to the first stage register in the tree structure. Each of the registers of a last stage in the memory data path 240 may provide data to each of the plurality of memory banks in the memory 300. In other words, the registers of the last stage in the memory data path 240 may respectively correspond to the plurality of memory banks.

In the data processing apparatus 10 according to an exemplary embodiment of the inventive concept, a selected transaction TRS_SEL, in which the traffic conflict does not occur among the plurality of transactions, selected by a data selection operation of the transaction selection circuit 220 in the data bus 200 is provided to the memory 300 via the memory data path 240. In the comparative example shown in FIG. 10, since transactions having traffic conflicts are simultaneously transferred to the memory data path 240, many registers are required because each path corresponding to each of the plurality of memory banks requires a plurality of registers.

However in the data processing apparatus 10 according to an exemplary embodiment of the inventive concept, since only the selected transaction TRS_SEL in which a traffic conflict does not occur is provided to the memory data path 240 by the transaction selection circuit 220, the memory data path 240 may be designed by using less registers than those of the comparative example. In other words, according to an exemplary embodiment of the inventive concept, the vector data VEC including the plurality of transactions may be transferred from the processor 100 to the memory 300 by using only a small amount of hardware resources. In addition, the amount of power consumed by the data bus 200 may be reduced by efficiently transferring the plurality of transactions to the memory 300.

Figure 2:
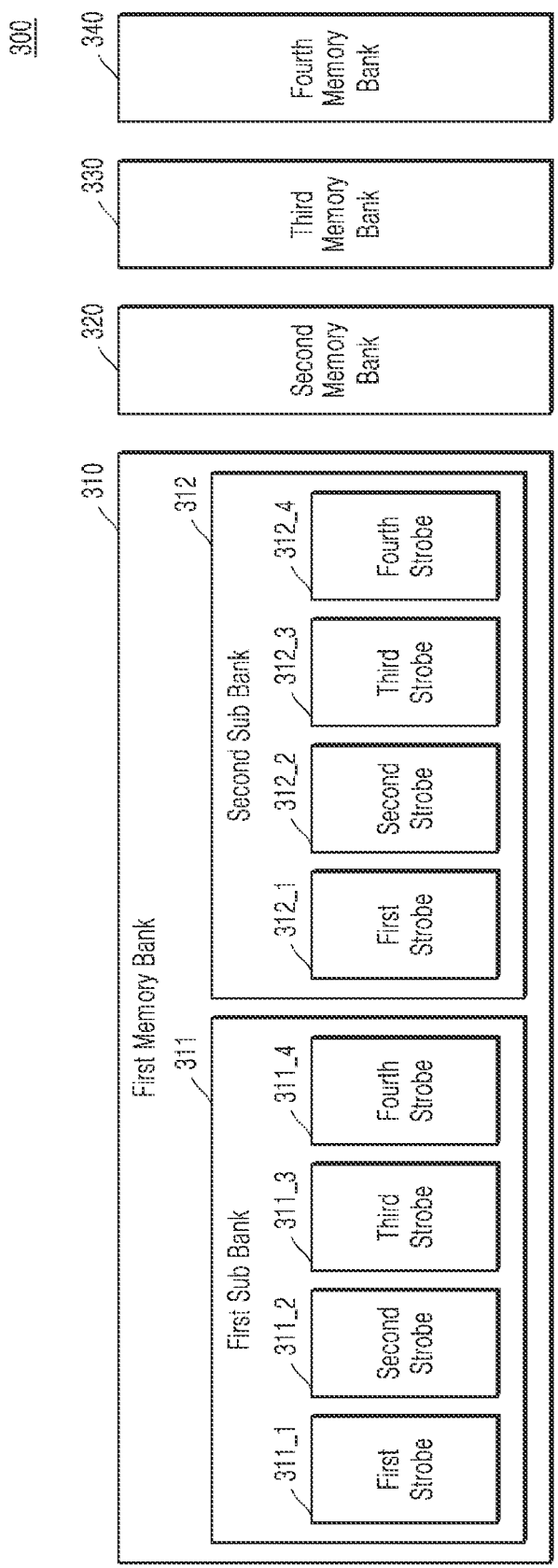
FIG. 2 illustrates a memory according to an exemplary embodiment of the inventive concept.

FIG. 2 illustrates the memory 300 according to an exemplary embodiment of the inventive concept. The memory 300 may correspond to the memory 300 in FIG. 1, and duplicate descriptions of the memory 300 in FIG. 1 are omitted.

The memory 300 includes a plurality of memory banks. FIG. 2 illustrates an embodiment in which the memory 300 includes four memory banks, but the number of memory banks is not limited thereto, and the memory 300 may include any other number of memory banks. For example, the memory 300 may include only one memory bank.

The memory 300 includes a first memory bank 310, a second memory bank 320, a third memory bank 330, and a fourth memory bank 340. In an exemplary embodiment, a single memory bank has a size capable of storing one vector data VEC. For example, when the size of one vector data VEC is about 512 bits, the memory bank is capable of storing 512 bits. Each of the plurality of memory banks may include a plurality of sub-banks. As a representative example, the first memory bank 310 is described below.

The first memory bank 310 includes a first sub-bank 311 and a second sub-bank 312. Sizes of the first sub-bank 311 and the second sub-bank 312 may be variously set. In other words, the first memory bank 310 may include different numbers of sub-banks.

The first sub-bank 311 includes a first strobe 311_1, a second strobe 3112, a third strobe 311_3, and a fourth strobe 311_4. The second sub-bank 312 includes a first strobe 312_1, a second strobe 3122, a third strobe 3123, and a fourth strobe 312_4. Sizes of the strobes may be variously set. In other words, each of the first sub-bank 311 and the second sub-bank 312 may include different numbers of strobes. In an exemplary embodiment, a strobe means a memory having a size capable of storing one transaction.

Figure 3:
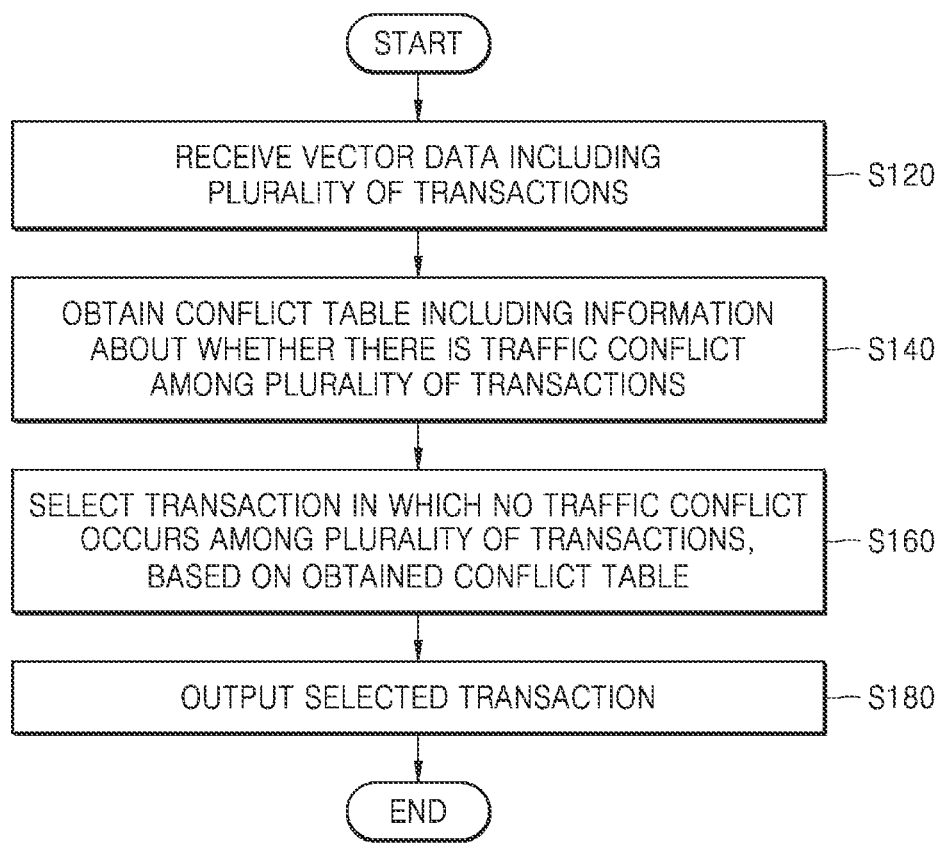
FIG. 3 is a flowchart of a data processing method of a data bus, according to an exemplary embodiment of the inventive concept.

FIG. 3 is a flowchart of a data processing method of the data bus 200, according to an exemplary embodiment of the inventive concept. FIG. 3 is described with reference to FIG. 1.

The data bus 200 receives the vector data VEC including the plurality of transactions (S120). For example, the data bus 200 may receive the vector data VEC including the plurality of transactions from the processor 100.

The data bus 200 obtains a conflict table including information on whether a traffic conflict occurs among the plurality of transactions (S140). For example, the transaction selection circuit 220 may obtain the conflict table. In an embodiment, the conflict table is a square matrix in which the total number of rows and columns correspond to the number of transactions, and an element value corresponding to an $i^{th}$ row and a $j^{th}$ column (each of i and j is a natural number of 1 or more and less than the number of transactions) is a value indicating whether there is traffic conflict between the $i^{th}$ transaction and the $j^{th}$ transaction. For example, the element value of the matrix may have a first logical value (for example, '0') in response to no traffic conflict occurrence, and a second logical value (for example, '1') in response to the traffic conflict occurrence. An embodiment of the conflict table according to this example is described in more detail with reference to FIG. 5A. In an exemplary embodiment, when the plurality of transactions include first through $N^{th}$ transactions (where N is a natural number), the conflict table includes first through $N^{th}$ rows. For example, in the first row of the conflict table, all element values may be padded with the first logical value (for example, '0'), an (i+1) row of the conflict table may include values indicating whether the traffic conflict occurs between an $i^{th}$ transaction (i is a natural number of 1 or more and N−2 or less) and the $(i+1)^{th}$ transaction through $N^{th}$ transactions, and the $N^{th}$ row of the conflict table may include a value indicating whether the traffic conflict occurs between an (N−1) transaction and the $N^{th}$ transaction. An embodiment of the conflict table according to this example is described in more detail with reference to FIG. 5B. In addition, an embodiment of a generating method of the conflict table is described in more detail with reference to FIG. 6.

Based on the obtained conflict table, the data bus 200 selects transactions in which the traffic conflict does not occur among the plurality of transactions (S160). For example, the transaction selection circuit 220 may, based on the conflict table, provide the selected transaction TRS_SEL to the memory data path 240 by selecting transactions in which no traffic conflict occurs among the plurality of transactions. For example, if the transactions include first through fourth transactions and there is only a conflict between the second and third transactions, then either the first transaction or the fourth transaction are selected or both the first and the fourth transactions are selected. An embodiment of selecting the selected transaction TRS_SEL based on the conflict table is described in more detail with reference to FIGS. 7 and 8A through 8E.

The data bus 200 outputs the selected transaction TRS_SEL (S180). For example, the data bus 200 may output the selected transaction TRS_SEL to the outside of the data bus 200 via the memory data path 240 including registers connected in a tree structure. The data bus 200 may provide the selected transaction TRS_SEL to the memory 300.

In the data processing method of the data bus 200 according to an exemplary embodiment of the inventive concept, a selected transaction TRS_SEL, in which the traffic conflict does not occur among the plurality of transactions, selected by a data selection operation of the transaction selection circuit 220 in the data bus 200 is provided to the memory 300 via the memory data path 240. In the comparative example shown in FIG. 10, since transactions having traffic conflicts are simultaneously transferred to the memory data path 240, many registers may be required because each path corresponding to each of the plurality of memory banks requires a plurality of registers. However in the data processing apparatus 10 according to an exemplary embodiment of the inventive concept, since only the selected transaction TRS_SEL in which a traffic conflict does not occur is provided to the memory data path 240 by the transaction selection circuit 220, the memory data path 240 may designed using less registers than those of the comparative example. In other words, according to an exemplary embodiment of the inventive concept, the vector data VEC including the plurality of transactions may be transferred from the processor 100 to the memory 300 by using only a small amount of hardware resources. In addition, the amount of power consumed by the data bus 200 may be reduced by efficiently transferring the plurality of transactions to the memory 300.

Figure 4:
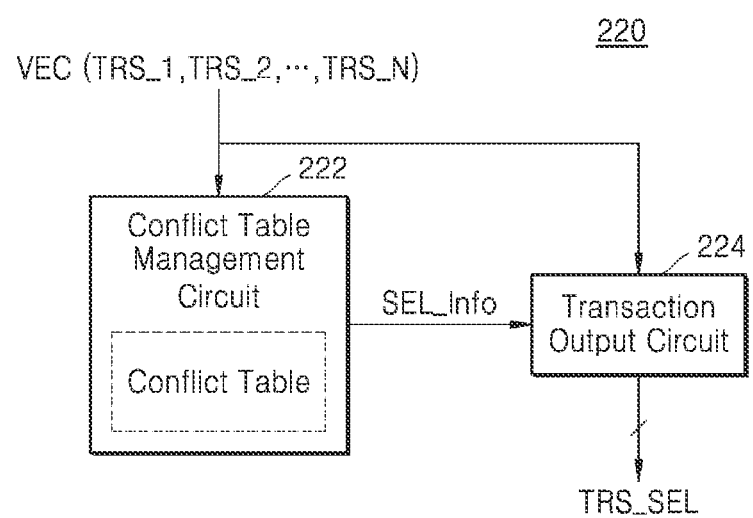
FIG. 4 illustrates a data bus according to an exemplary embodiment of the inventive concept.

FIG. 4 illustrates the transaction selection circuit 220 according to an exemplary embodiment of the inventive concept. The transaction selection circuit 220 of FIG. 4 may correspond to the transaction selection circuit 220 described with reference to FIGS. 1 and 3. Duplicate descriptions of the transaction selection circuit 220 with reference to previous diagrams are omitted. FIG. 4 is described with reference to FIG. 1.

The transaction selection circuit 220 includes a conflict table management circuit 222 and a transaction output circuit 224. The transaction selection circuit 220 of the data bus 200 may receive the vector data VEC including the plurality of transactions from the processor 100. For example, the vector data VEC may include a first transaction TRS_1, a second transaction TRS_2, ..., an $N^{th}$ transaction TRS_N (where N is a natural number of 1 or more).

The conflict table management circuit 222 may obtain a conflict table including information about whether there is a traffic conflict among a plurality of transactions, and may update the conflict table. In an exemplary embodiment of the inventive concept, the conflict table management circuit 222 outputs selection information SEL_Info (e.g., a signal) for selecting the selected transaction TRS_SEL in which the traffic conflict does not occur among the plurality of transactions based on the conflict table. For example, the selection information SEL_Info may include a list of transactions included in the selected transaction TRS_SEL. The conflict table management circuit 222 provides the selection information SEL_Info to the transaction output circuit 224.

The transaction output circuit 224 may select the selected transaction TRS_SEL among the first through $N^{th}$ transactions TRS_1 through TRS_N based on the selection information SEL_Info provided by the conflict table management circuit 222. For example, the selection information SEL_Info may include a unique identifier (ID) that identifies each of the transactions so that the transaction output circuit 224 can determine a subset of the vector data VEC to output. The selected transaction TRS_SEL may include one or more transactions.

An exemplary embodiment in which the conflict table management circuit 222 generates and updates the conflict table and a particular embodiment in which the transaction output circuit 224 outputs the selected transaction TRS_SEL are described in more detail with reference to the following drawings.

Figure 5B:
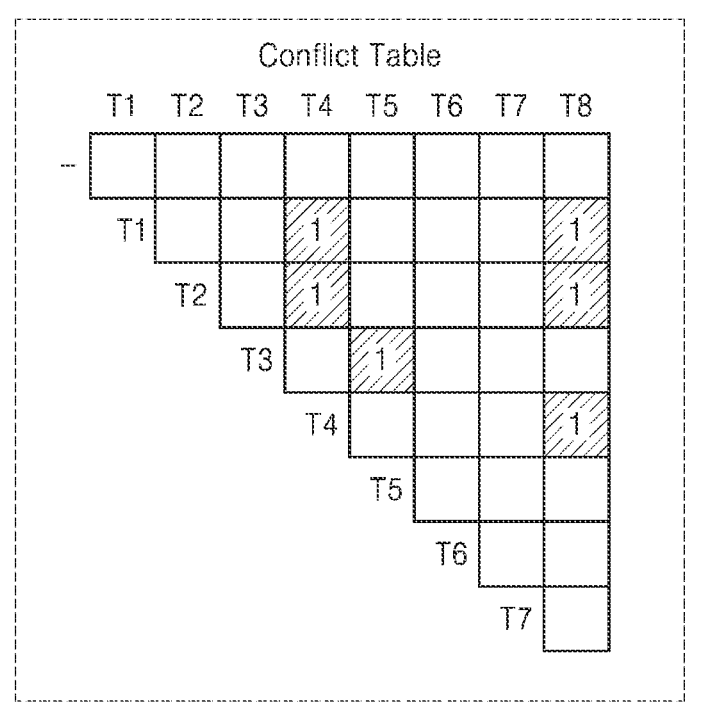

FIGS. 5A and 5B illustrate conflict tables according to exemplary embodiments of the inventive concept. FIGS. 5A and 5B illustrate conflict tables corresponding to embodiments in which the vector data VEC includes 8 transactions, but the number of transactions included in the vector data VEC is not limited thereto. FIGS. 5A and 5B illustrate, as non-limiting examples, embodiments in which the vector data VEC includes first through eighth transactions T1 through T8. FIGS. 5A and 5B are described together with reference to FIGS. 1 and 4.

Referring to FIG. 5A, the conflict table includes a square matrix, and sizes of rows and columns of the square matrix correspond to the number of transactions. In this case, the element value corresponding to an $i^{th}$ row and a $j^{th}$ column of the square matrix (wherein, i and j are natural numbers of 1 or more and the number of transactions or less) is a value indicating whether there is a traffic conflict between the $i^{th}$ transaction and the $j^{th}$ transaction. Each of the element values has the first logical value (for example, '0') in response to no traffic conflict occurrence among transactions, and the second logical value (for example, '1') in response to the traffic conflict occurrence. Accordingly, in an embodiment, all of the element values corresponding to a diagonal of the square matrix included in the conflict table may have the first logical values, and the square matrix may be a symmetric matrix. The element values along the diagonal may be ignored since they only reference a single transaction.

Referring to FIG. 5A, a traffic conflict occurs between the first transaction T1 and the fourth transaction T4, between the first transaction T1 and the eighth transaction T8, between the second transaction T2 and the fourth transaction T4, between the second transaction T2 and the eighth transaction T8, between the third transaction T3 and the fifth transaction T5, and between the fourth transaction T4 and the eighth transaction T8. Accordingly, the element values that correspond to coordinate values of (1,4), (1, 8), (2,4), (2,8), (3,5), and (4,8) in the square matrix included in the conflict table have the second logical values of '1', and the element values corresponding to coordinate values symmetric to the coordinate values also have the second logical values of '1'. For example, the symmetric coordinate values include (4,1), (8,1), (4,2), (8,2), (5,3), and (8,4).

Referring to FIG. 5B, when the vector data VEC includes the first through $N^{th}$ transactions TRS_1 through TRS_N, the conflict table may include N rows. For example, the conflict table may include the first through $N^{th}$ rows, and all element values of the first row of the conflict table are padded with the first logical value '0'. In the second through $(N-1)^{th}$ rows of the conflict table, the $(i+1)^{th}$ row includes values indicating whether there is a traffic conflict between the $i^{th}$ transaction (i is a natural number of 1 or more and N−2 or less) and the (i+1)$^{th}$ through N$^{th}$ transactions. The N$^{th}$ row of the conflict table may include a value indicating whether there is a traffic conflict between the (N−1)$^{th}$ transaction and the N$^{th}$ transaction.

It is assumed that the traffic conflict occurs between the first transaction T1 and the fourth transaction T4, between the first transaction T1 and the eighth transaction T8, between the second transaction T2 and the fourth transaction T4, between the second transaction T2 and the eighth transaction T8, between the third transaction T3 and the fifth transaction T5, and between the fourth transaction T4 and the eighth transaction T8. The first row of the conflict table is padded with the first logical value '0'. The second row of the conflict table includes a value indicating whether there is a conflict between the first transaction T1 and each of the second through eighth transactions T2 through T8. Similarly, the second row of the conflict table includes a value indicating whether there is a conflict between the second transaction T2 and each of the third through eighth transactions T3 through T8. The fourth row of the conflict table includes a value indicating whether there is a conflict between the third transaction T3 and each of the fourth through eighth transactions T4 through T8. The fifth row of the conflict table includes a value indicating whether there is a conflict between the fourth transaction T4 and each of the fifth through eighth transactions T5 through T8. The sixth row of the conflict table includes a value indicating whether there is a conflict between the fifth transaction T5 and each of the sixth through eighth transactions T6 through T8. The seventh row of the conflict table includes a value indicating whether there is a conflict between the sixth transaction T6 and each of the seventh through eighth transactions T7 through T8. The eighth row of the conflict table includes a value indicating whether there is a conflict between the seventh transaction and the eighth transaction. In an exemplary embodiment, the conflict table of FIG. 5B is implemented using six linear arrays for the second through seventh rows and a single variable for the eighth row. In this embodiment, each next one of the linear arrays has one less element.

Figure 6:
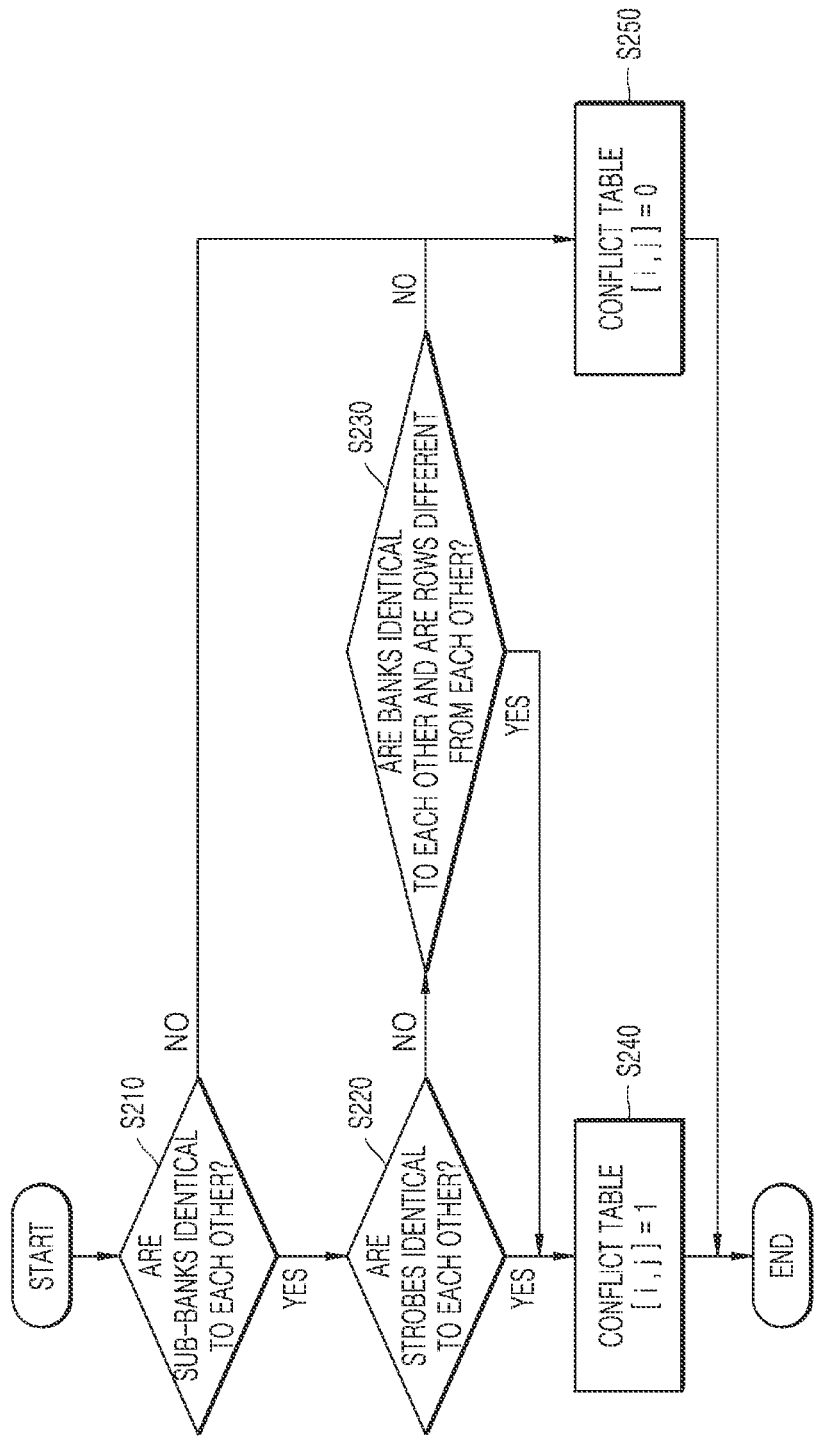
FIG. 6 is a flowchart of a conflict table generating method of a data bus, according to an exemplary embodiment of the inventive concept.

FIG. 6 is a flowchart of a conflict table generating method of a data bus, according to an exemplary embodiment of the inventive concept. In particular, FIG. 6 may be a flowchart of a method of determining whether there is a traffic conflict between the i$^{th}$ transaction and the j$^{th}$ transaction in the process of creating the conflict table. FIG. 6 is described together with reference to FIGS. 1, 2, and 4.

The data bus 200 or the transaction selection circuit 220 determines whether a sub-bank in which the i$^{th}$ transaction is stored is identical to a sub-bank in which the j$^{th}$ transaction is stored (S210). For example, the conflict table management circuit 222 may determine whether the sub-bank in which the i$^{th}$ transaction is stored is identical to the sub-bank in which the j$^{th}$ transaction is stored. That sub-banks are identical to each other may include not only the case where the sub-banks are identical to each other in an identical bank, but also the case where the sub-banks correspond to each other in different banks. For example, if a first transaction is stored in the first sub bank 311 of the first memory bank 310 and a second transaction is stored in a first sub bank of the second memory bank 320, these transactions could be interpreted as belonging to an identical bank, in certain embodiments. When the sub-bank in which the i$^{th}$ transaction is stored is identical to the sub-bank in which the j$^{th}$ transaction is stored, operation S220 is performed; otherwise, operation S250 is performed.

When the sub-bank in which the i$^{th}$ transaction is stored is identical to the sub-bank in which the j$^{th}$ transaction is stored, the data bus 200 or the transaction selection circuit 220 determines whether a strobe in which the i$^{th}$ transaction is stored is identical to a strobe in which the j$^{th}$ transaction is stored (S220). For example, the conflict table management circuit 222 may determine whether the strobe in which the i$^{th}$ transaction is stored is identical to a strobe in which the j$^{th}$ transaction is stored. A fact that strobes are identical to each other may include not only the case where the strobes are identical to each other in an identical sub-bank, but also the case where the strobes correspond to each other in different sub-banks. For example, if a first transaction is stored in the first strobe 311_1 of the first sub bank 311 and a second transaction is stored in a first strobe 312_1 of the second sub bank 312, these transactions could be interpreted as belonging to an identical strobe, in certain embodiments. When the strobe in which the i$^{th}$ transaction is stored is identical to the strobe in which the j$^{th}$ transaction is stored, operation S240 is performed; otherwise, operation S230 is performed.

When the sub-bank in which the i$^{th}$ transaction is stored is identical to the sub-bank in which the j$^{th}$ transaction is stored, but the strobe in which the i$^{th}$ transaction is stored is different from the strobe in which the j$^{th}$ transaction is stored, the data bus 200 or the transaction selection circuit 220 determines whether the bank in which the i$^{th}$ transaction is stored is identical to the bank in which the j$^{th}$ transaction is stored, and the row in which the i$^{th}$ transaction is stored is identical to the row in which the j$^{th}$ transaction is stored (S230). When the bank in which the i$^{th}$ transaction is stored is identical to the bank in which the j$^{th}$ transaction is stored, and the row in which the i$^{th}$ transaction is stored is different from the row in which the j$^{th}$ transaction is stored, operation S240 is performed; otherwise, operation 250 is performed.

When the sub-bank in which the i$^{th}$ transaction is stored is identical to the sub-bank in which the j$^{th}$ transaction is stored, and the strobe in which the i$^{th}$ transaction is stored is identical to the strobe in which the j$^{th}$ transaction is stored, or when the sub-bank in which the i$^{th}$ transaction is stored is identical to the sub-bank in which the j$^{th}$ transaction is stored, the strobe in which the i$^{th}$ transaction is stored is different from the strobe in which the j$^{th}$ transaction is stored, the bank in which the i$^{th}$ transaction is stored is identical to the bank in which the j$^{th}$ transaction is stored, and the row in which the i$^{th}$ transaction is stored is different from the row in which the j$^{th}$ transaction is stored, the value at the i$^{th}$ row and the j$^{th}$ row of the conflict table may have the second logical value '1' (S240). Alternatively, in an embodiment as illustrated in FIG. 5B, the element value including the value indicating whether there is a traffic conflict with the j$^{th}$ transaction in the (i+1)$^{th}$ row may have the second logical value '1'.

When the sub-bank in which the i$^{th}$ transaction is stored is different from the sub-bank in which the j$^{th}$ transaction is stored, or when the sub-bank in which the i$^{th}$ transaction is stored is identical to the sub-bank in which the j$^{th}$ transaction is stored, the strobe in which the i$^{th}$ transaction is stored is different from the strobe in which the j$^{th}$ transaction is stored, the bank in which the i$^{th}$ transaction is stored is different from the bank in which the j$^{th}$ transaction is stored, and the row in which the i$^{th}$ transaction is stored is identical to the row in which the j$^{th}$ transaction is stored, the value at the i$^{th}$ row and the j row of the conflict table may have the first logical value '0' (S250). Alternatively, in an embodiment as illustrated in FIG. 5B, the element value including the value indicating whether there is a traffic conflict with the $j^{th}$ transaction in the $(i+1)^{th}$ row may have the first logical value '0'.

Figure 7:
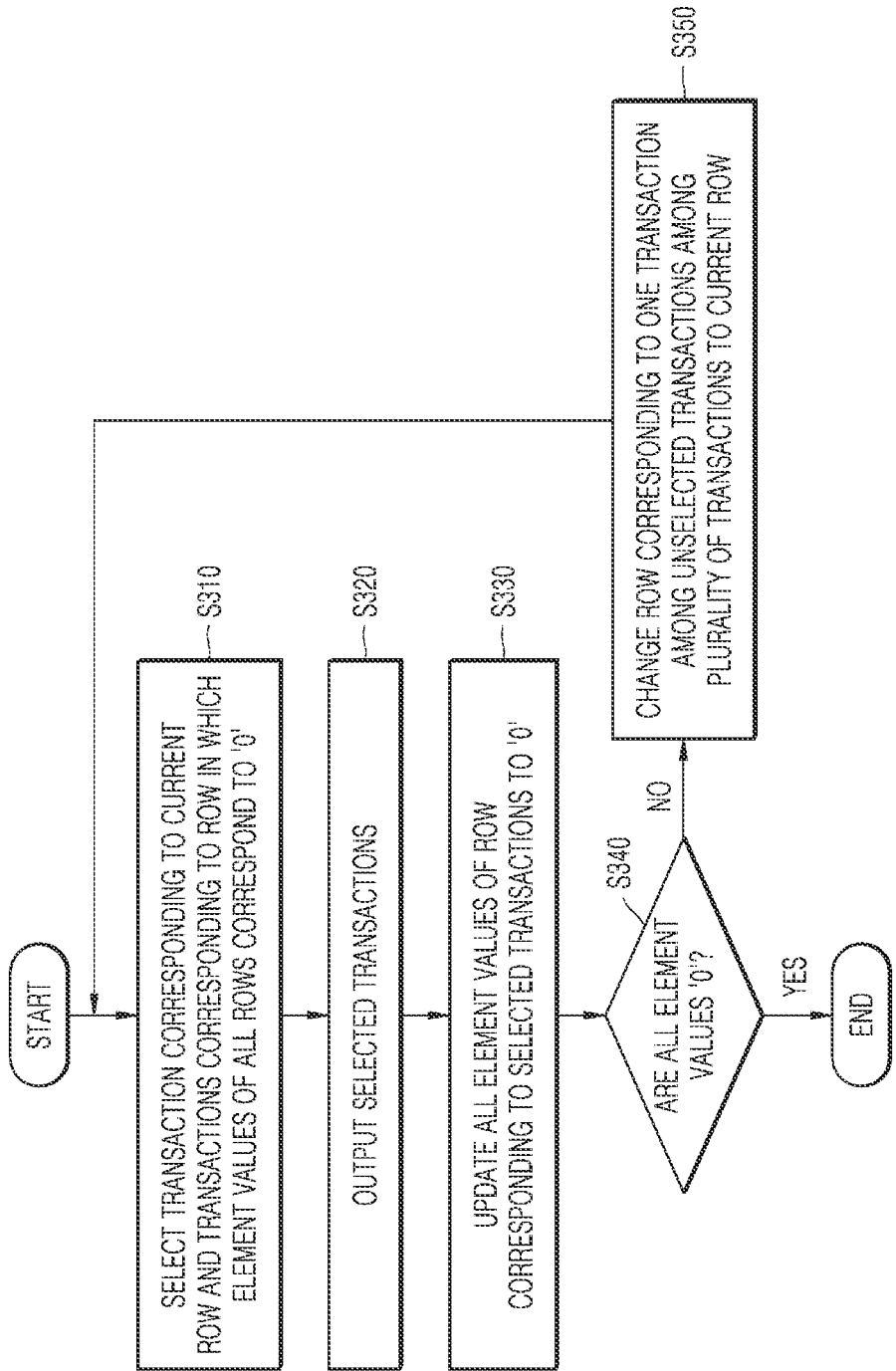
FIG. 7 is a flowchart of a data processing method of a data bus, according to an exemplary embodiment of the inventive concept.

FIG. 7 is a flowchart of a data processing method of the data bus 200, according to an exemplary embodiment of the inventive concept. In particular, FIG. 7 illustrates a flowchart of the data processing method using the conflict table as illustrated in FIG. 5B. FIG. 7 is described together with reference to FIGS. 1 and 4.

The data bus 200 or the transaction selection circuit 220 selects a transaction corresponding to the current row and transactions corresponding to a column in which the element values of all rows are the first logical values (S310). An initial current row may be a row corresponding to the first transaction, and the current row may be updated by operation S350. In an embodiment, the transaction selection circuit 220 performs an OR operation on each of all elements in the current row based on the conflict table by using all element values in a column including the elements. The transaction selection circuit 220 may select a transaction corresponding to a column in which a result value of the OR operation is the first logical value.

The data bus 200 or the transaction selection circuit 220 outputs transactions or a transaction selected according to operation S310 (S320). For example, the transaction selection circuit 220 may provide the selected transaction TRS_SEL to the memory data path 240, and the memory data path 240 may provide the selected transaction TRS_SEL to the plurality of memory banks in the memory 300.

The data bus 200 or the transaction selection circuit 220 updates all element values of the row corresponding to the selected transactions to the first logical value '0' (S330). For example, the conflict table management circuit 222 in the transaction selection circuit 220 may update the conflict table by updating all element values in rows corresponding to each of the selected transactions in the conflict table to the first logical value '0'.

The data bus 200 or the transaction selection circuit 220 determines whether all element values in the conflict table are the first logical values (S340). When the value of at least one element in the conflict table is not the first logical value, operation S350 is performed.

In an embodiment, when all element values in the conflict table are the first logical values, and the last transaction has not been provided to the memory data path 240, the transaction selection circuit 220 may provide the last transaction to the memory data path 240. When all element values in the conflict table are the first logical values, and the last transaction has been provided to the memory data path 240, a transferring operation of the vector data VEC by the data bus 200 has been completed.

When at least one element value in the conflict table is not the first logical value, the data bus 200 changes a row corresponding to one transaction among unselected transactions among the plurality of transactions to the current row (S350). For example, the transaction selection circuit 220 may perform an operation after operation S310 again by changing the row corresponding to one of the unselected transactions to the current row.

By repeatedly performing operations S310 through S350 through at least one loop before moving from operation S340 to the last operation, the data bus 200 may store the vector data VEC to the memory 300.

FIGS. 8A through 8E are diagrams illustrating processes of a data processing method of the data bus 200, according to exemplary embodiments of the inventive concept. FIGS. 8A through 8E are diagrams for exemplarily explaining an embodiment of processing the vector data VEC by using a conflict table, according to exemplary embodiments described with reference to FIG. 5B. In other words, although an embodiment in which the vector data VEC includes eight transactions is illustrated, the number of transactions included in the vector data VEC and whether the traffic conflict occurs among transactions are not limited thereto. FIGS. 8A through 8E are described with reference to FIGS. 1 and 4 together.

Figure 8A:
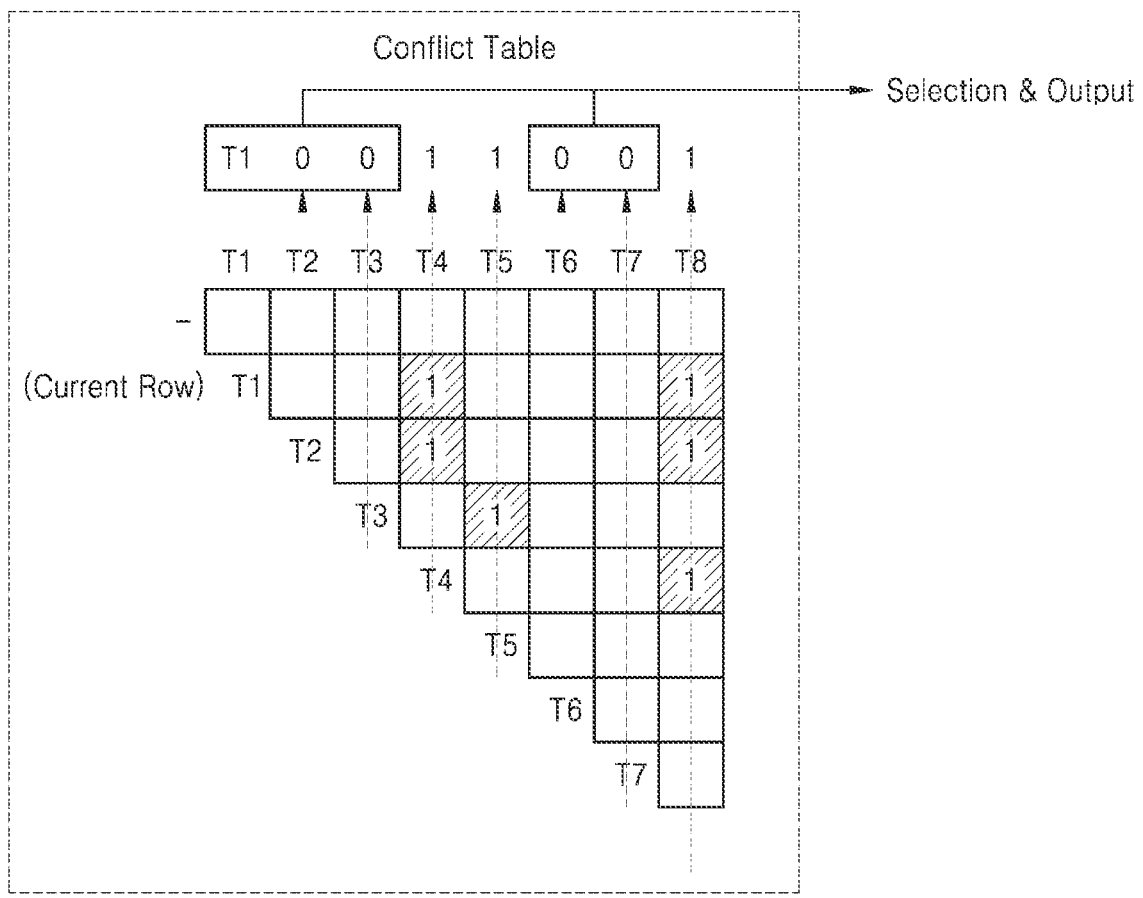

In particular, FIG. 8A is a diagram for explaining the data processing method corresponding to operations S310 and S320 in FIG. 7. Referring to FIG. 8A, the current row may be a row corresponding to the first transaction T1. In other words, the current row may be the second row. The transaction selection circuit 220 determines, for all elements in the current row, whether all element values in the column including the corresponding elements have the first logical values of '0'. To make this determination, the transaction selection circuit 220 may perform a logical OR operation on the second through eighth columns by using all element values in the corresponding column. The transaction selection circuit 220 may select, as a transaction to output, transactions corresponding to the column in which the result value of the logical OR operation is the first logical value '0' and the first transaction T1 that is the transaction corresponding to the current row. In other words, the transaction selection circuit 220 may select the first transaction T1, the second transaction T2, the third transaction T3, the sixth transaction T6, and the seventh transaction T7 as the selected transaction TRS_SEL, and may output the selected transaction TRS_SEL. For example, in FIG. 8A, since the first, second, third, sixth, and seventh columns only include the first logical value, their corresponding transactions are output.

Figure 8B:
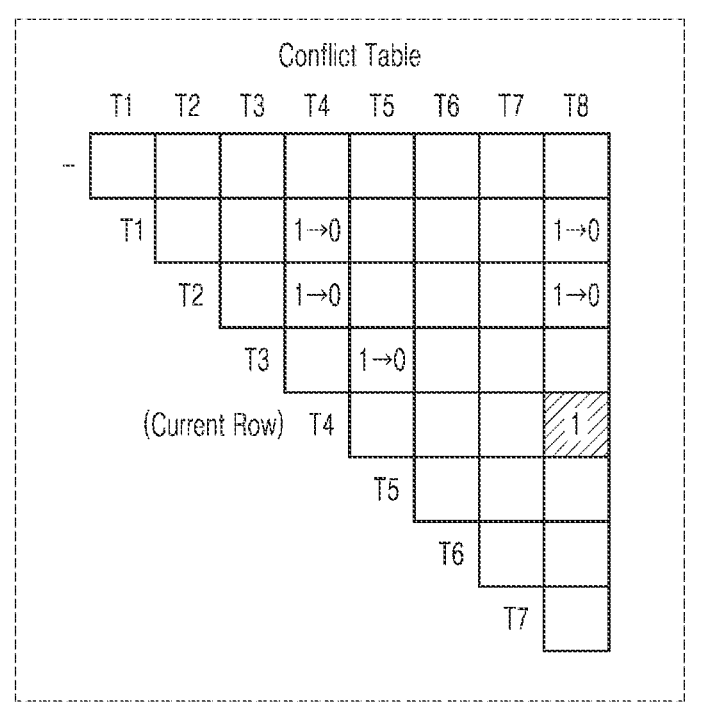

FIG. 8B is a diagram for explaining the data processing method particularly corresponding to operations S330 through S350 in FIG. 7. Referring to FIG. 8B, the transaction selection circuit 220 updates all element values of the row corresponding to the selected transaction TRS_SEL to the first logical value. In other words, the transaction selection circuit 220 may update the value of the element having the second logical value in the row corresponding to the first transaction T1 to the first logical value, update the value of the element having the second logical value in the row corresponding to the second transaction T2 to the first logical value, and update the value of the element having the second logical value in the row corresponding to the third transaction T3 to the first logical value. Because there is no element having the second logical value in the row corresponding to the sixth transaction T6 and the seventh transaction T7, updating is not necessary. Thereafter, the transaction selection circuit 220 determines whether all element values in the updated conflict table have the first logical values. However, because an element having the second logical value exists in the fourth transaction T4, operation S350 for updating the current row is performed. The transaction selection circuit 220 changes the current row to a row corresponding to the fourth transaction T4, which is one of the unselected transactions.

Figure 8C:
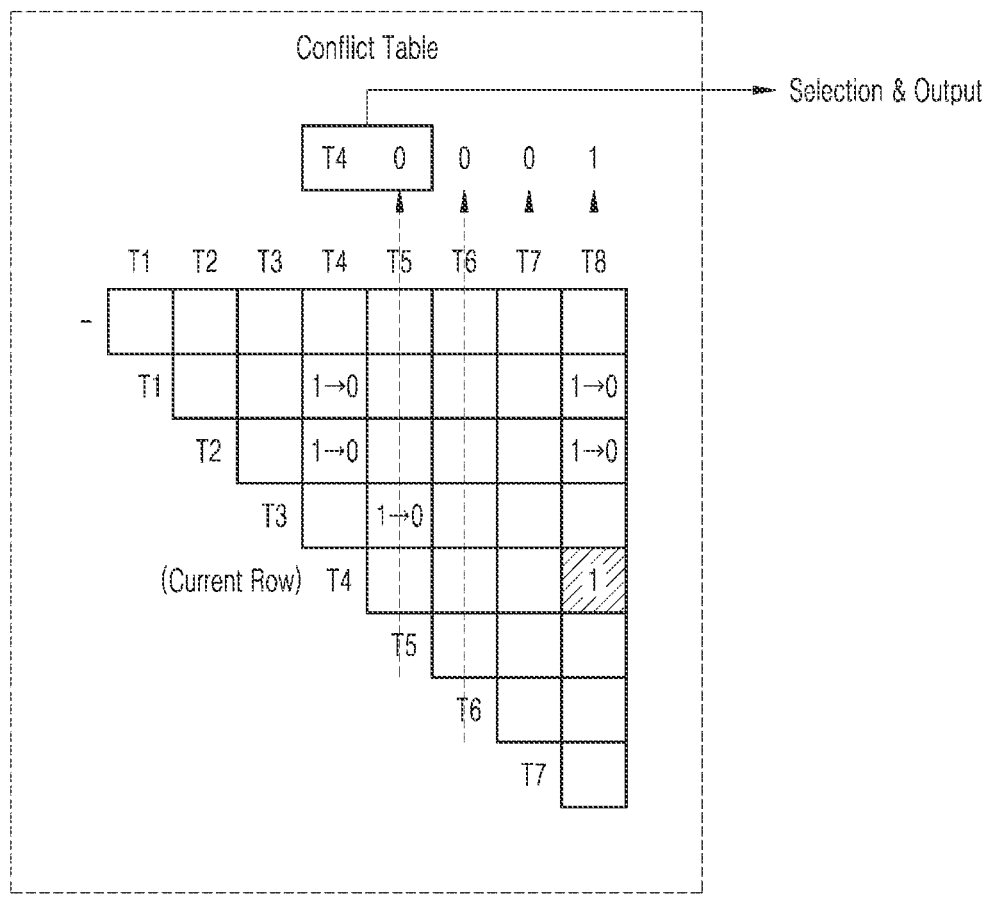

FIG. 8C is a diagram for explaining the data processing method corresponding to operations S310 and S320 in FIG. 7, which are performed after the conflict table is updated. Referring to FIG. 8C, the transaction selection circuit 220 may determine, for all elements in the current row, whether all element values in the column including the corresponding elements have the first logical values of '0'. To make this determination, the transaction selection circuit 220 may perform a logical OR operation on the fifth through eighth columns by using all element values in the corresponding column. The transaction selection circuit 220 may select, as transactions to output, transactions corresponding to the column in which the result value of the logical OR operation is the first logical value '0' among the unselected transactions and the fourth transaction T4 that is the transaction corresponding to the current row. In other words, the transaction selection circuit 220 may select the fourth transaction T4 and the fifth transaction T5 as the selected transactions TRS_SEL, and may output the selected transaction TRS_SEL. Because the sixth transaction T6 and the seventh transaction T7 have already been output as described with reference to FIG. 8A, they are not selected, even though the result values of the logical OR operation of the row corresponding to the sixth transaction T6 and the seventh transaction T7 have the first logical value.

Figure 8D:
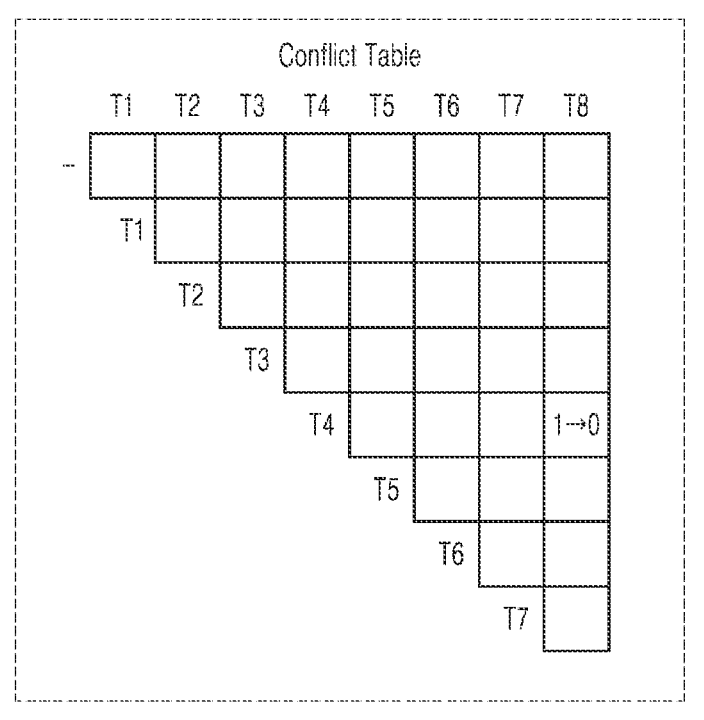

FIG. 8D is a diagram for explaining the data processing method corresponding to operations S330 through S350 in FIG. 7, which are performed after update of the conflict table has completed. Referring to FIG. 8D, the transaction selection circuit 220 may update all element values of the row corresponding to the selected transaction TRS_SEL to the first logical values. In other words, the transaction selection circuit 220 may update the value of the element having the second logical value in the row corresponding to the fourth transaction T4 to the first logical value. Because there is no element having the second logical value in the row corresponding to the fifth transaction T5, updating is not necessary. Thereafter, the transaction selection circuit 220 may determine whether all element values in the updated conflict table have the first logical values. The transaction selection circuit 220 may determine that all element values in the conflict table have the first logical values.

Figure 8E:
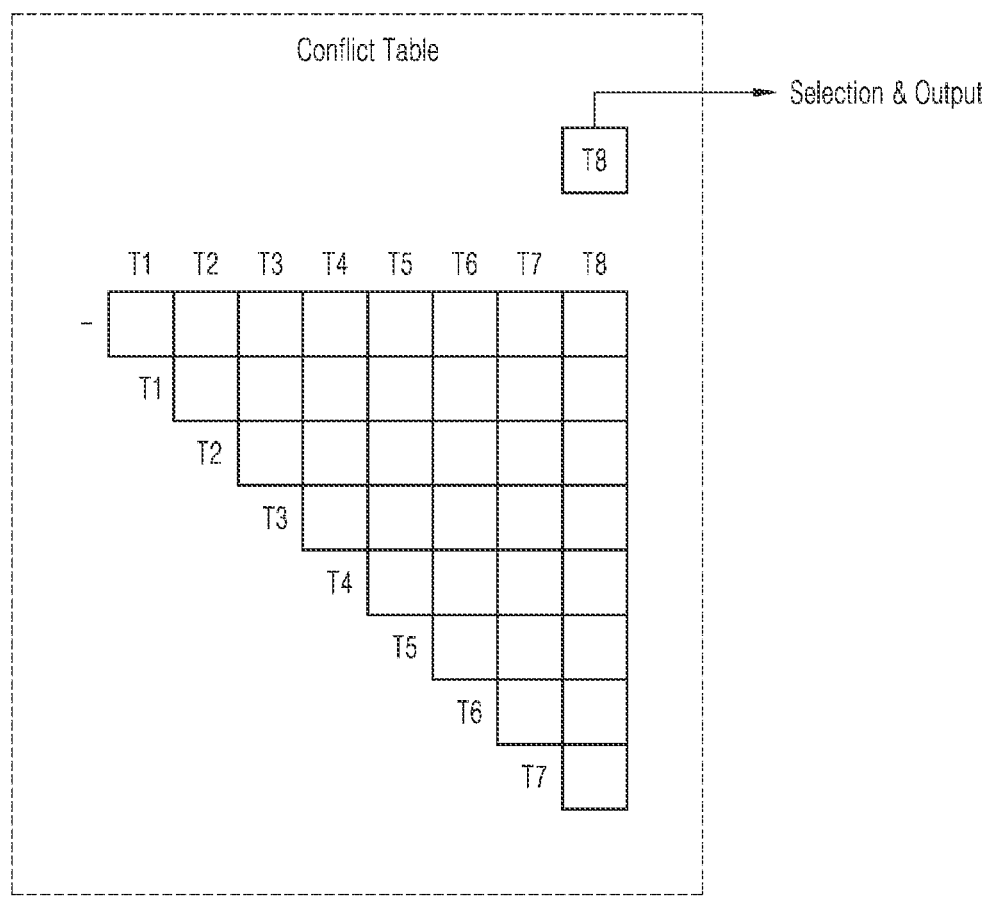

FIG. 8E is a diagram for explaining the data processing method corresponding to an operation after operation S340 in FIG. 7. Finally, the transaction selection circuit 220 determines whether the last transaction, or the eighth transaction T8, has been output. When the eighth transaction T8 has been output to the memory 300 via the memory data path 240, the transaction selection circuit 220 does not additionally output a transaction. However, when the eighth transaction T8 has not been output to the memory 300 via the memory data path 240, the transaction selection circuit 220 may output the eighth transaction T8 as the selected transaction TRS_SEL.

Figure 9:
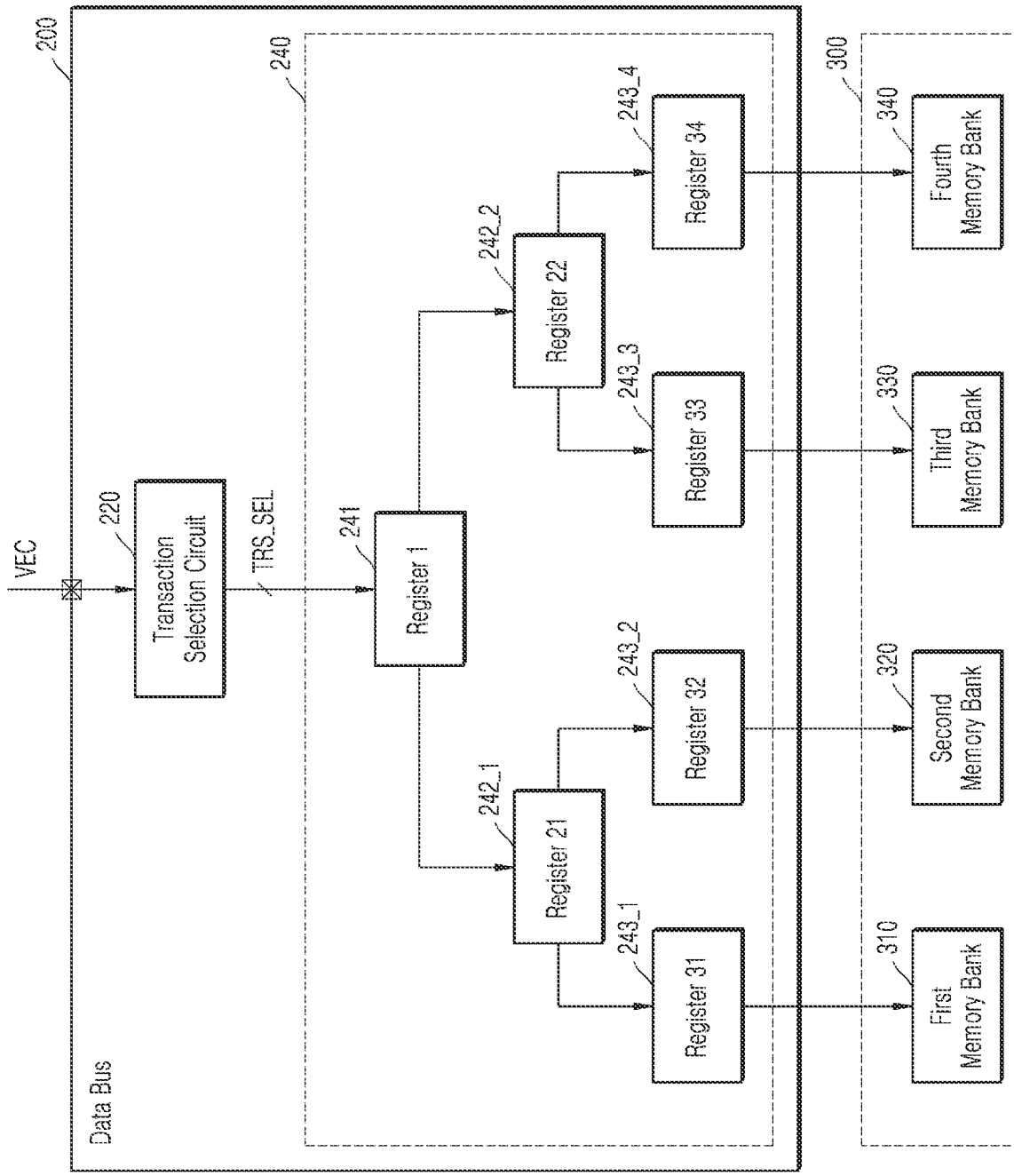
FIG. 9 illustrates a data bus and a memory according to an exemplary embodiment of the inventive concept.

FIG. 9 illustrates the data bus 200 and the memory 300 according to an exemplary embodiment of the inventive concept. The data bus 200 and the memory 300 may correspond to the data bus 200 and the memory 300 in FIG. 1, respectively, and duplicate descriptions thereof are omitted.

The memory 300 includes a plurality of memory banks, for example, the first memory bank 310, the second memory bank 320, the third memory bank 330, and the fourth memory bank 340.

The memory data path 240 includes a plurality of registers, and the plurality of registers are connected to each other in a tree structure. The memory data path 240 includes a plurality of stage registers. For example, a first register 241, as a first stage register, receives the selected transaction TRS_SEL from the transaction selection circuit 220. The first register 241 provides the selected transaction TRS_SEL to second stage registers according to a memory bank in which at least one transaction included in the selected transaction TRS_SEL is to be stored.

The second stage registers include a first-second stage register 242_1 and a second-second stage register 242_2. The first-second stage register 242_1 and the second-second stage register 242_2 receives a transaction from the first register 241.

The third stage registers include a first-third stage register 243_1, a second-third stage register 2432, and a third-third register 2433, and a fourth-third stage register 243_4. The first-third stage register 243_1 and the second-third stage register 243_2 receive a transaction from the first-second stage register 242_1, and the third-third stage register 243_3 and the fourth-third stage register 243_4 receive a transaction from the second-second stage register 242_2.

Each of the registers included in the last stage registers, or the third stage registers, may correspond to each of the memory banks, and provide data (or a transaction) via a respective output terminal to the corresponding memory bank. For example, the first-third stage register 243_1 corresponds to the first memory bank 310 and provides a transaction to the first memory bank 310, the second-third stage register 2432 corresponds to the second memory bank 320 and provides a transaction to the second memory bank 320, the third-third stage register 243_3 corresponds to the third memory bank 330 and provides a transaction to the third memory bank 330, and the fourth-third stage register 243_4 corresponds to the fourth memory bank 340 and provides a transaction to the fourth memory bank 340.

Figure 10:
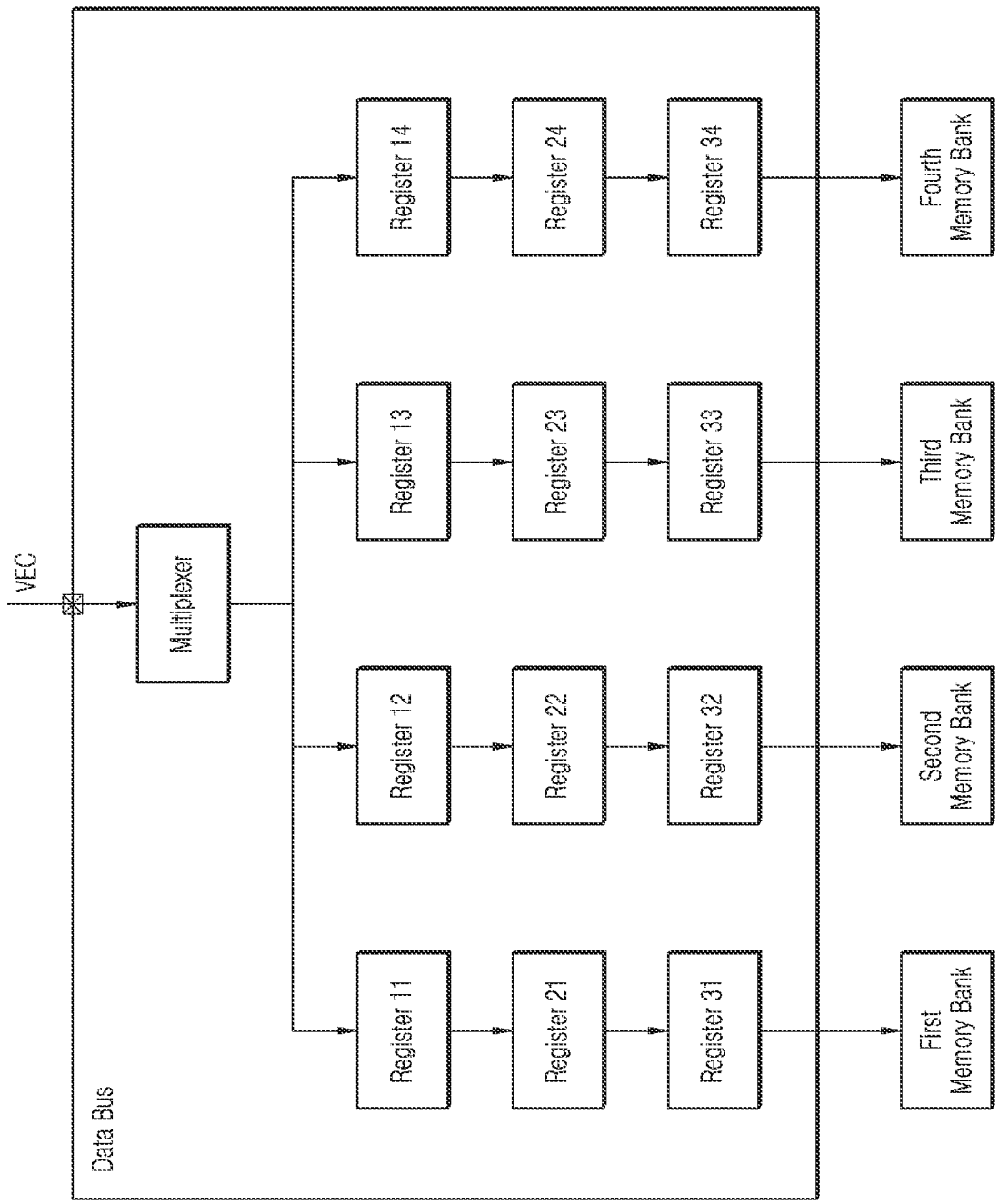
FIG. 10 illustrates a data bus and a memory according to a comparative example.

FIG. 10 illustrates the data bus 200 and the memory 300 according to a comparative example. The data bus 200 according to the comparative example includes a multiplexer that receives the vector data VEC including a plurality of transactions, and registers on a memory path corresponding to each of the memory banks. For example, it is necessary to pass through three registers (a register 11, a register 21, and a register 31) to reach the first memory bank 310 from the multiplexer.

Each of the paths corresponding to the memory banks requires a plurality of registers because of a possibility that a traffic conflict occurs among a plurality of transactions included in the vector data VEC. When transactions in which the traffic conflict occurs simultaneously enter a path corresponding to one memory bank, because the corresponding transactions need to be sequentially provided to the memory bank, many registers are required.

Referring again to FIG. 9, in the data bus 200 according to an exemplary embodiment of the inventive concept, because the transaction selection circuit 220 selects a transaction in which the traffic conflict does not occur among the plurality of transactions based on the conflict table, and provides the selected transaction TRS_SEL to the memory data path 240, the memory data path 240 may be designed using a lesser number of registers than the data bus 200 according to the comparative example with reference to FIG. 10. In other words, according to an exemplary embodiment of the inventive concept, the vector data VEC including the plurality of transactions may be transferred to the memory 300 by using only a small amount of hardware resources. In addition, the amount of power consumed by the data bus 200 may be reduced by efficiently transferring the plurality of transactions to the memory 300.

Figure 11:
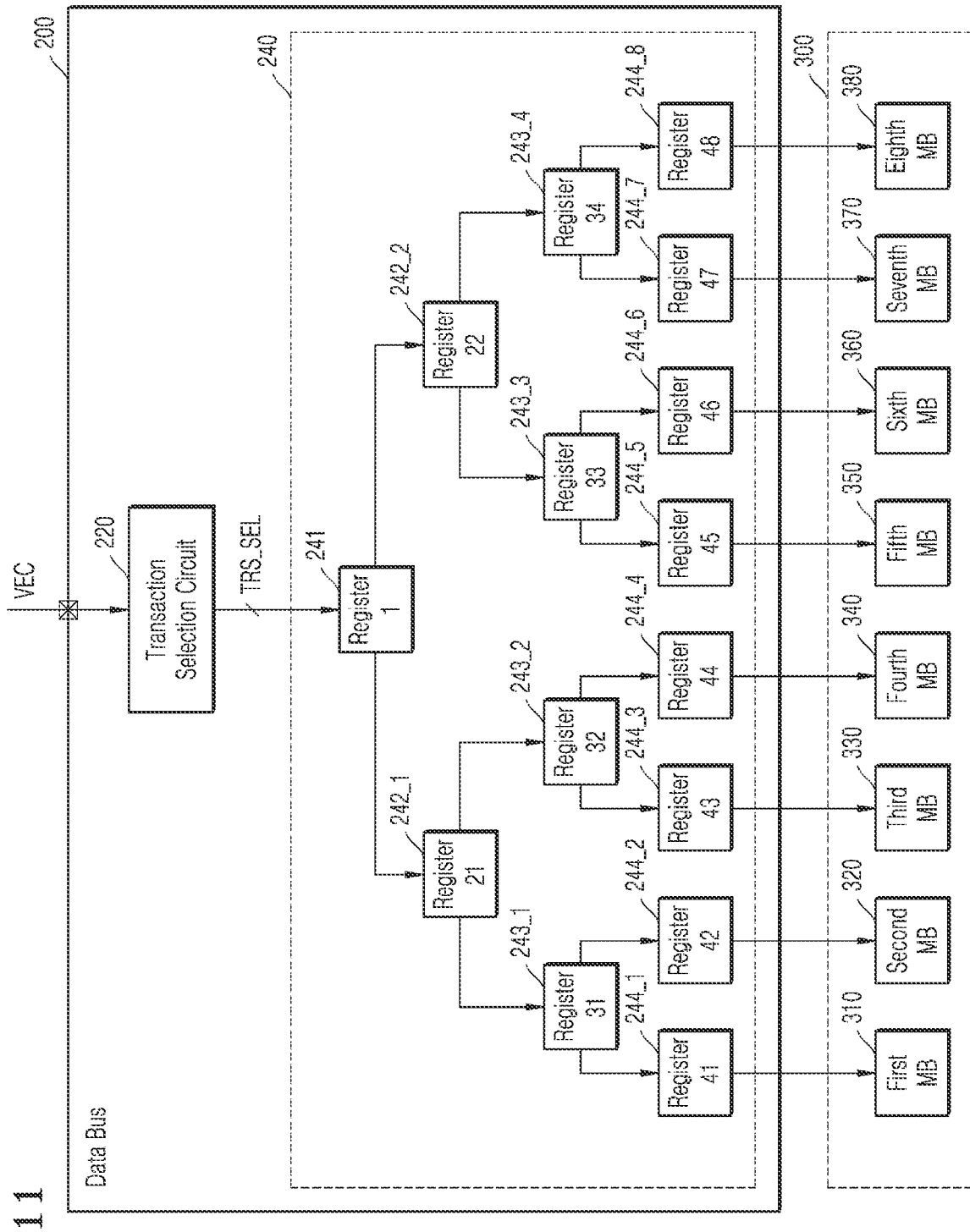
FIG. 11 illustrates a data bus and a memory according to an exemplary embodiment of the inventive concept.

FIG. 11 illustrates the data bus 200 and the memory 300 according to an exemplary embodiment of the inventive concept. The data bus 200 and the memory 300 may correspond to the data bus 200 and the memory 300 in FIG. 1, respectively, and duplicate descriptions thereof are omitted.

The memory 300 includes a plurality of memory banks, for example, the first memory bank 310, the second memory bank 320, the third memory bank 330, the fourth memory bank 340, a fifth memory bank 350, a sixth memory bank 360, a seventh memory bank 370, and an eighth memory bank 380.

The memory data path 240 includes a plurality of registers, and the plurality of registers are connected to each other in a tree structure. The memory data path 240 includes a plurality of stage registers. For example, the first register 241, as a first stage register, receives the selected transaction TRS_SEL from the transaction selection circuit 220. The first register 241 provides the selected transaction TRS_SEL to second stage registers according to a memory bank in which at least one transaction included in the selected transaction TRS_SEL is to be stored.

The second stage registers include a first-second stage register 242_1 and a second-second stage register 242_2. The first-second stage register 242_1 and the second-second stage register 242_2 receive a transaction from the first register 241.

The third stage registers include a first-third stage register 243_1, a second-third stage register 243_2, a third-third register 2433, and a fourth-third stage register 243_4. The first-third stage register 243_1 and the second-third stage register 243_2 receive a transaction from the first-second stage register 242_1, and the third-third stage register 243_3 and the fourth-third stage register 243_4 receive a transaction from the second-second stage register 242_2.

The fourth stage registers include a first-fourth stage register 244_1, a second-fourth stage register 2442, a third-fourth stage register 2443, a fourth-fourth stage register 244_4, a fifth-fourth stage register 2445, a sixth-fourth stage register 2446, a seventh-fourth stage register 2447, and an eighth-fourth stage register 244_8. The first-fourth stage register 244_1 and the second-fourth stage register 244_2 receive a transaction from the first-third stage register 243_1, the third-fourth stage register 244_3 and the fourth-fourth stage register 244_4 receive a transaction from the second-third stage register 243_2, the fifth-fourth stage register 244_5 and the sixth-fourth stage register 244_6 receive a transaction from the third-third stage register 243_3, and the seventh-fourth stage register 244_7 and the eighth-fourth stage register 244_8 receive a transaction from the fourth-third stage register 243_4.

Each of the registers included in the last stage registers, or the fourth stage registers, may correspond to each of the memory banks, and provide data (or a transaction) to the corresponding memory bank. For example, the first-fourth stage register 2441 may correspond to the first memory bank 310 and provide a transaction to the first memory bank 310, the second-fourth stage register 2442 may correspond to the second memory bank 320 and provide a transaction to the second memory bank 320, the third-fourth stage register 244_3 may correspond to the third memory bank 330 and provide a transaction to the third memory bank 330, the fourth-fourth stage registers 2444 may correspond to the fourth memory bank 340 and provide a transaction to the fourth memory bank 340, the fifth-fourth stage register 244_5 may correspond to the fifth memory bank 350 and provide a transaction to the fifth memory bank 350, the sixth-fourth stage register 2446 may correspond to the sixth memory 360 and provide a transaction to the sixth memory bank 360, the seventh-fourth stage register 244_7 may correspond to the seventh memory bank 370 and provide a transaction to the third memory bank 370, and the eighth-fourth stage register 244_8 may correspond to the eighth memory bank 380 and provide the transaction to the eighth memory bank 380.

Figure 12:
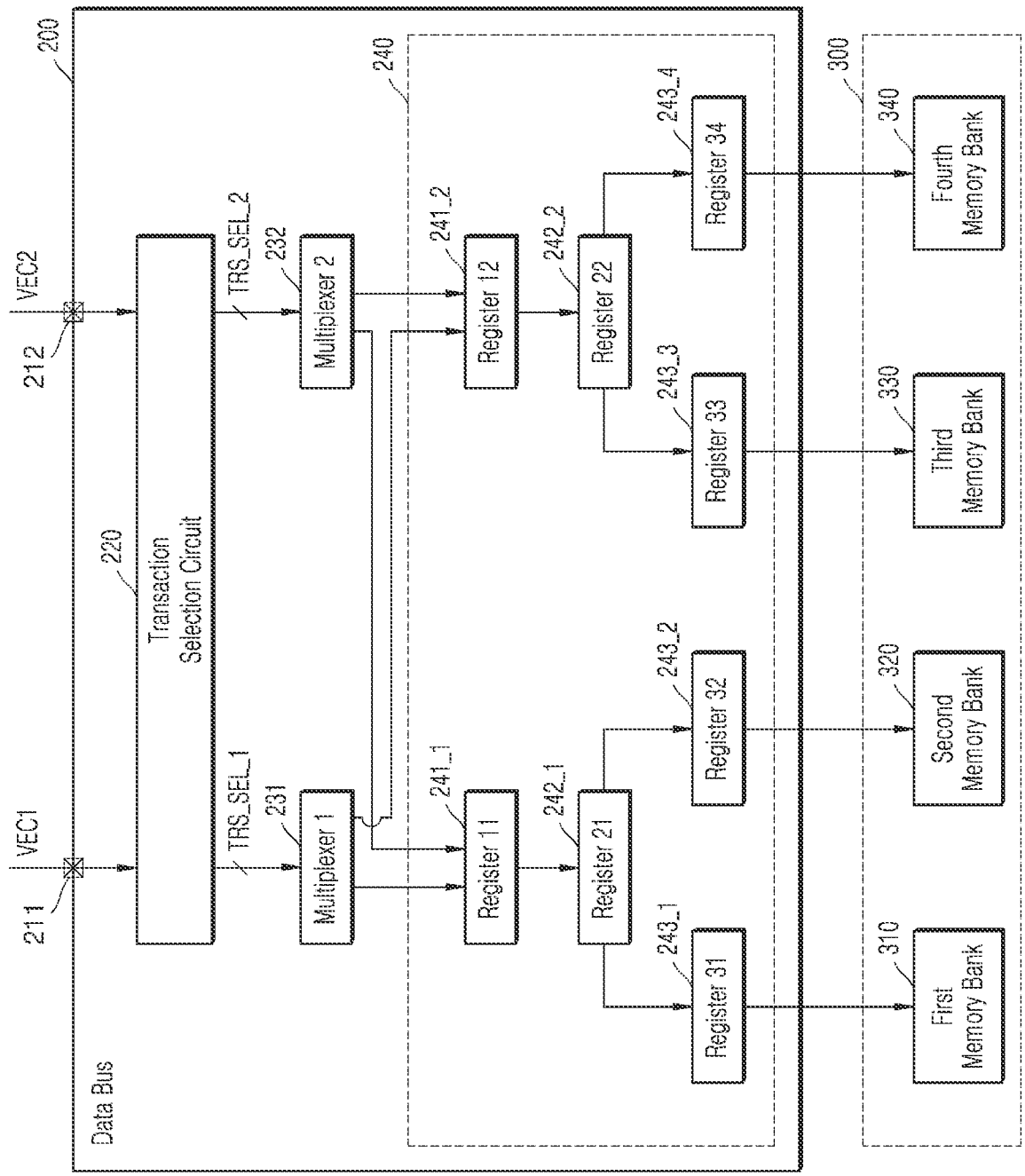
FIG. 12 illustrates a data bus and a memory according to an exemplary embodiment of the inventive concept.

FIG. 12 illustrates the data bus 200 and the memory 300 according to an exemplary embodiment of the inventive concept. FIG. 12 illustrates an embodiment of the data bus 200 that receives first vector data VEC1 via first input port 211 and receives second vector data VEC2 via a second input port 212.

The data bus 200 includes the transaction selection circuit 220, a first multiplexer 231, a second multiplexer 232, and the memory data path 240.

The data bus 200 receives the first vector data VEC1 including a plurality of first transactions via the first input port 211, and receives the second vector data VEC2 including a plurality of second transactions via the second input port 212.

The transaction selection circuit 220 outputs a first selection transaction TRS_SEL_1 in which the traffic conflict does not occur among a plurality of first transactions included in the first vector data VEC1, and outputs a second selection transaction TRS_SEL_2 in which the traffic conflict does not occur among the plurality of second transactions included in the second vector data VEC2. Selection and outputting of the first selection transaction TRS_SEL_1 and selection and outputting of the second selection transaction TRS_SEL_2 of the transaction selection circuit 220 may be performed substantially in the same manner as in the embodiments described with reference to FIGS. 1 through 11. The transaction selection circuit 220 provides the first selection transaction TRS_SEL_1 to the first multiplexer 231, and the second selection transaction TRS_SEL_2 to the second multiplexer 232.

The memory 300 includes the first memory bank 310, the second memory bank 320, the third memory bank 330, and the fourth memory bank 340. The memory data path 240 includes the first-first stage registers 241_1, the second-first stage registers 2412, the first-second stage register 242_1, the second-second stage register 242_2, the first-third stage register 243_1, the second-third stage register 2432, the third-third stage register 2433, and the fourth-third stage register 243_4.

The first multiplexer 231 provides the first selection transaction TRS_SEL_1 provided by the transaction selection circuit 220 to the first-first stage register 241_1 or the second-first stage register 241_2. A first control signal may be provided to the first multiplexer 231 that informs the first multiplexer 231 which one of the first-first stage register 241_1 and the second-first stage register 241_2 to output the first selection transaction TRS_SEL_1.

The second multiplexer 232 provides the second selection transaction TRS_SEL_2 provided by the transaction selection circuit 220 to the first-first stage register 241_1 or the second-first stage register 241_2. A second control signal may be provided to the first multiplexer 231 that informs the second multiplexer 232 which one of the first-first stage register 241_1 and the second-first stage register 241_2 to output the second selection transaction TRS_SEL_2.

The first-first stage register 241_1 may temporarily store a transaction provided by the first multiplexer 231 and/or a transaction provided by the second multiplexer 232, and provide the transaction to the first-second stage register 242_1.

The second-first stage register 241_2 may temporarily store a transaction provided by the first multiplexer 231 and/or a transaction provided by the second multiplexer 232, and provide the transaction to the second-second stage register 242_2.

The first-third stage register 243_1 and the second-third stage register 243_2 receive a transaction from the first-second stage register 242_1.

The third-third stage register 243_3 and the fourth-third stage register 243_4 receive a transaction from the second-second stage register 242_2.

Each of the registers included in the last stage registers, or the third stage registers, may correspond to each of the memory banks, and provide data (or a transaction) to the corresponding memory bank. For example, the first-third stage register 2431 may correspond to the first memory bank 310 and provide a transaction to the first memory bank 310, the second-third stage register 243_2 may correspond to the second memory bank 320 and provide a transaction to the second memory bank 320, the third-third stage register 243_3 may correspond to the third memory bank 330 and provide a transaction to the third memory bank 330, and the fourth-third stage register 2434 may correspond to the fourth memory bank 340 and provide a transaction to the fourth memory bank 340.

While the inventive concept has been particularly shown and described with reference to embodiments thereof, it will be understood that various changes in form and details may be made therein without departing from the spirit and scope of the disclosure.

What is claimed is:

1. A data bus comprising:
   a transaction selection circuit configured to receive vector data including a plurality of transactions from outside of the data bus, select at least one transaction from the plurality of transactions in which no traffic conflict occurs based on whether there is a traffic conflict among the plurality of transactions with reference to a conflict table, and output the selected at least one transaction; and
   a memory data path comprising at least one register and configured to output the selected at least one transaction provided by the transaction selection circuit via the at least one register to the outside of the data bus,
   wherein the transaction selection circuit selects a row of the conflict table associated with a first transaction of the transactions, references element values of columns of the selected row to determine at least one second transaction of the transactions that has no conflict with the first transaction and sets the at least one transaction to at least one of the first transaction and the at least one second transaction and performs a logical OR operation on at least one column in the conflict table by using all element values included in the corresponding column.

2. The data bus of claim 1, wherein the transaction selection circuit generates the conflict table including information about whether there is a traffic conflict among the plurality of transactions.

3. The data bus of claim 2, wherein the transaction selection circuit, after outputting the at least one transaction, updates the conflict table based on information about the at least one transaction, and by selecting at least one other transaction from the plurality of transactions excluding the at least one transaction based on the conflict table, outputs the selected at least one transaction.

4. The data bus of claim 1, wherein the transaction selection circuit comprises:
   a conflict table management circuit configured to generate the conflict table including information about whether there is a traffic conflict among the plurality of transactions, update the conflict table, and output selected information including information about the selected at least one transaction based on the conflict table; and
   a transaction output circuit configured to output the selected at least one transaction among the plurality of transactions based on the selected information provided by the conflict table management circuit.

5. The data bus of claim 1, wherein the transaction selection circuit outputs the selected at least one transaction based on the conflict table,
   wherein the conflict table includes a square matrix in which a row length and a column length thereof correspond to a number transactions, and an element value corresponding to an $i^{th}$ row and a $j^{th}$ column includes a value indicating whether there is a traffic conflict between the $i^{th}$ transaction and the $j^{th}$ transaction, and
   wherein i and j are natural numbers $>=1$ and $<=$the number of transactions.

6. The data bus of claim 1, wherein the plurality of transactions comprise a first transaction through an $N^{th}$ transaction, and
   wherein the transaction selection circuit outputs the selected at least one transaction based on the conflict table,
   wherein the conflict table includes a first row through an $N^{th}$ row, all element values of the first row are padded with first logical values, an $(i+1)^{th}$ row includes values indicating whether there is a traffic conflict between an $i^{th}$ transaction and an $(i+1)^{th}$ transaction through the $N^{th}$ transaction, and the $N^{th}$ row includes a value indicating whether there is a traffic conflict between the $(N-1)^{th}$ transaction and the $N^{th}$ transaction,
   wherein N is a natural number,
   wherein i is a natural number $>=1$ and $(N-2)$ or less.

7. The data bus of claim 6, wherein a value indicating whether there is a traffic conflict between an $n^{th}$ transaction and an $m^{th}$ transaction included in the conflict table has a second logical value,
   when a sub-bank storing the $n^{th}$ transaction is identical to a sub-bank storing the $m^{th}$ transaction, and a strobe storing the $n^{th}$ transaction is identical to a strobe storing the $m^{th}$ transaction, or when the sub-bank storing the $n^{th}$ transaction is identical to the sub-bank storing the $m^{th}$ transaction, and the strobe storing the $n^{th}$ transaction is different from the strobe storing the $m^{th}$ transaction, a bank storing the $n^{th}$ transaction is identical to a bank storing the $m^{th}$ transaction, and a row storing the $n^{th}$ transaction is different from a row storing the $m^{th}$ transaction,
   wherein n and m are natural numbers.

8. The data bus of claim 6, wherein the transaction selection circuit selects at least one transaction corresponding to a column in which element values of all rows in the conflict table indicate the first logical value and a transaction corresponding to a current row as the selected at least one transaction, and outputs the selected at least one transaction.

9. The data bus of claim 8, wherein the transaction selection circuit selects at least one transaction corresponding to a column in which a result value of performing the logical OR operation indicates the first logical value as a portion of the selected at least one transaction.

10. The data bus of claim 8, wherein the transaction selection circuit updates all element values of a row corresponding to the selected at least one transaction in the conflict table to the first logical value, and in response to that at least one element value in the updated conflict table having the second logical value, changes the current row to a row corresponding to one transaction among the plurality of transactions that is unselected.

11. The data bus of claim 1, wherein the memory data path comprises a plurality of stages, the stages comprising a plurality of registers connected to each other in a tree structure, and the memory data path outputs the selected at least one transaction via the registers corresponding to a last stage among the plurality of stages and via a plurality of output terminals.

12. A data processing method of a data bus, the method comprising:
receiving, by the data bus, vector data including a plurality of transactions;
obtaining, by the data bus, a conflict table including information about whether there is a traffic conflict among the plurality of transactions;
selecting, by the data bus, at least one transaction from the transactions in which no traffic conflict occurs among the plurality of transactions based on the conflict table; and
outputting, by the data bus, the selected at least one transaction,
wherein the selecting comprises:
selecting a row of the conflict table associated with a first transaction of the transactions;
referencing element values of columns of the selected row to determine at least one second transaction of the transactions that has no conflict with the first transaction; and
setting the at least one transaction to at least one of the first transaction and the at least one second transaction,
wherein the plurality of transactions comprise a first transaction through an $N^{th}$ transaction,
wherein the conflict table includes a first row through an $N^{th}$ row, all element values of the first row are padded with first logical values, an $(i+1)^{th}$ row comprises values indicating whether there is a traffic conflict between an $i^{th}$ transaction and an $(i+1)^{th}$ transaction through the $N^{th}$ transaction, and the $N^{th}$ row comprises a value indicating whether there is a traffic conflict between the $(N-1)^{th}$ transaction and the $N^{th}$ transaction,
wherein N is a natural number, and
wherein i is a natural number $>=1$ and (N−2) or less.

13. The method of claim 12, further comprising:
updating the conflict table based on information about the selected at least one transaction; and
outputting at least one transaction among the plurality of transactions that is unselected based on the updated conflict table.

14. The method of claim 12, wherein the obtaining of the conflict table includes determining whether there is a traffic conflict between an $n^{th}$ transaction and an $m^{th}$ transaction,
wherein the determining of whether there is a traffic conflict comprises:
determining that there is a traffic conflict between the $n^{th}$ transaction and the $m^{th}$ transaction in response to determining that a sub-bank storing the $n^{th}$ transaction is identical to a sub-bank storing the $m^{th}$ transaction, and determining that a strobe storing the $n^{th}$ transaction is identical to a strobe storing the $m^{th}$ transaction; and
determining that there is a traffic conflict between the $n^{th}$ transaction and the $m^{th}$ transaction in response to determining that a sub-bank storing the $n^{th}$ transaction is identical to a sub-bank storing the $m^{th}$ transaction, determining that a strobe storing the $n^{th}$ transaction is not identical to a strobe storing the $m^{th}$ transaction, determining that a bank storing the $n^{th}$ transaction is identical to a bank storing the $m^{th}$ transaction, and determining that a row storing the $n^{th}$ transaction is identical to a row storing the $m^{th}$ transaction,
wherein n and m are natural numbers.

15. The method of claim 12, wherein the selecting of the at least one transaction comprises selecting at least one transaction corresponding to a column in which element values of all rows in the conflict table indicate the first logical value and a transaction corresponding to a current row as the selected at least one transaction.

16. The method of claim 15, wherein the selecting of the at least one transaction comprises:
performing a logical OR operation on at least one row in the conflict table by using all element values included in a corresponding row; and
selecting at least one transaction in which a result value of performing the logical OR operation corresponds to a row indicating the first logical value as a portion of the selected at least one transaction.

17. The method of claim 15, further comprising:
updating all element values in a row corresponding to the selected at least one transaction in the conflict table to the first logical value; and
in response to determining that at least one element value in the updated conflict table has a second logical value, changing a current row to a row corresponding to one transaction among one transaction among the plurality of transactions that is unselected.

18. A data processing device comprising:
a processor configured to output vector data including a plurality of transactions;
a memory comprising a plurality of memory banks and configured to store the plurality of transactions; and
a data bus configured to select at least one transaction in which no traffic conflict occurs among the plurality of transactions, based on whether there is a traffic conflict among the plurality of transactions, and provide the selected at least one transaction to the plurality of memory banks via a memory data path having a tree structure,
wherein the data bus selects a row of a conflict table associated with a first transaction of the transactions, references element values of columns of the selected row to determine at least one second transaction of the transactions that has no conflict with the first transaction and sets the at least one transaction to at least one of the first transaction and the at least one second transaction and performs a logical OR operation on at least one column in the conflict table by using all element values included in the corresponding column.

19. The data bus of claim 18, wherein the data bus obtains the conflict table including information about whether there is a traffic conflict among the plurality of transactions, outputs at least one first transaction in which no traffic conflict occurs among the plurality of transactions based on the conflict table, and after updating the conflict table based on information about the at least one first transaction, outputs at least one second transaction in which no traffic conflict occurs among the plurality of transactions based on the updated conflict table.

* * * * *